(12) United States Patent
Zhang et al.

(10) Patent No.: US 11,863,307 B2
(45) Date of Patent: Jan. 2, 2024

(54) CHANNEL STATE ESTIMATING AND REPORTING SCHEMES IN WIRELESS COMMUNICATION

(71) Applicant: ZTE Corporation, Guangdong (CN)

(72) Inventors: Nan Zhang, Guangdong (CN); Wei Cao, Guangdong (CN); Jianwu Dou, Guangdong (CN); Linxi Hu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 52 days.

(21) Appl. No.: 17/384,523

(22) Filed: Jul. 23, 2021

(65) Prior Publication Data

US 2021/0351959 A1 Nov. 11, 2021

Related U.S. Application Data

(63) Continuation of application No. PCT/CN2019/073187, filed on Jan. 25, 2019.

(51) Int. Cl.
*H04L 25/02* (2006.01)
*H04W 24/08* (2009.01)

(52) U.S. Cl.
CPC ........... *H04L 25/024* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 9,444,527 B2 | 9/2016 | Nagata et al. | |
| 9,813,135 B2 | 11/2017 | Abraham et al. | |
| 9,825,683 B2 | 11/2017 | Abraham et al. | |
| 9,867,070 B2 | 1/2018 | Luo et al. | |
| 10,904,783 B2 | 1/2021 | Chen et al. | |
| 11,533,099 B2 | 12/2022 | Kakishima et al. | |
| 2012/0250543 A1* | 10/2012 | Abraham | H04L 1/0025 370/252 |
| 2012/0250618 A1* | 10/2012 | Abraham | H04L 1/0026 370/328 |
| 2012/0257567 A1* | 10/2012 | Abraham | H04L 1/0003 370/328 |

(Continued)

FOREIGN PATENT DOCUMENTS

| | | |
|---|---|---|
| CN | 102595476 A | 7/2012 |
| CN | 103141044 A | 6/2013 |

(Continued)

OTHER PUBLICATIONS

European Search Report for EP Patent Application No. 19850182.7, dated Jan. 21, 2022, 15 pages.

(Continued)

*Primary Examiner* — Clemence S Han
(74) *Attorney, Agent, or Firm* — Perkins Coie LLP

(57) ABSTRACT

Methods, systems, and devices for channel state estimating and reporting schemes in wireless communication are described. In one aspect, a wireless communication method is provided to include transmitting, by a communication device, a channel state report message that includes at least one of a first field indicative of a value of a parameter or a second field that includes a deviation or a change rate of the parameter.

19 Claims, 12 Drawing Sheets

Transmitting a channel state report message that includes at least one of a first field indicative of a value of a parameter or a second field that includes a deviation or a change rate of the parameter.

(56) References Cited

U.S. PATENT DOCUMENTS

| | | | |
|---|---|---|---|
| 2012/0257605 A1* | 10/2012 | Abraham | H04L 5/0057 |
| | | | 370/338 |
| 2014/0369302 A1* | 12/2014 | Abraham | H04L 1/0026 |
| | | | 370/329 |
| 2015/0009928 A1 | 1/2015 | Sohn et al. | |
| 2015/0049706 A1 | 2/2015 | Lee et al. | |
| 2015/0139094 A1* | 5/2015 | Zirwas | H04B 7/065 |
| | | | 370/329 |
| 2016/0065276 A1 | 3/2016 | Zhang et al. | |
| 2017/0111133 A1 | 4/2017 | Yoshimoto et al. | |
| 2017/0279583 A1 | 9/2017 | Dinan | |
| 2018/0069612 A1* | 3/2018 | Yum | H04L 5/0091 |
| 2018/0123669 A1* | 5/2018 | Xi | H04W 72/121 |
| 2020/0052757 A1* | 2/2020 | Wang | H04B 17/391 |
| 2020/0092739 A1* | 3/2020 | Yang | H04L 5/0091 |
| 2021/0297118 A1* | 9/2021 | Kwak | H04B 7/0632 |

FOREIGN PATENT DOCUMENTS

| | | |
|---|---|---|
| CN | 107733595 A | 2/2018 |
| EP | 3 343 823 A1 | 7/2018 |
| JP | 2013-098955 A | 5/2013 |
| JP | 2013-541911 A | 11/2013 |
| JP | 2017-512419 A | 5/2017 |
| JP | 2018-502521 A | 1/2018 |
| JP | 2019-528022 A | 10/2019 |
| KR | 10-2013-0079568 A | 7/2013 |
| KR | 10-2016-0141000 | 12/2016 |
| KR | 10-2018-0030022 | 3/2018 |
| WO | 2012044865 A1 | 4/2012 |
| WO | 2015141419 A1 | 9/2015 |
| WO | 2017/007545 A1 | 1/2017 |
| WO | 2017/023230 A1 | 2/2017 |
| WO | 2018031870 A1 | 2/2018 |

OTHER PUBLICATIONS

Zte, et al., "Aperiodic CSI for NR MIMO," 3GPP TSG RAN WG1 Meeting #86, R1-1608693, Lisbon, Portugal, Oct. 10-14, 2016, 7 pages.

MTI, "Discussion on CSI feedback for LEO satellites in NTN," 3GPP TSG-RAN WG1 Meeting AH-1901, R1-1900819, Taipei, Taiwan, Jan. 21-25, 2019, 11 pages.

Catt, "Considerations on NTN PHY aspect," 3GPP TSG RAN WG1 Ad-Hoc Meeting 1901, R1-1900319, Taipei, Jan. 21-25, 2019, 3 pages.

Zte, "UL control enhancements for URLLC," 3GPP TSG RAN WG1 Ad-Hoc Meeting 1901, R1-1900070, Taipei, Jan. 21-25, 2019, 8 pages.

AT&T, "UCI Enhancements for NR," 3GPP TSG RAN WG1 Ad-Hoc Meeting 1901, R1-1900438, Taipei, Taiwan, Jan. 21-25, 2019, 13 pages.

International Search Report and Written Opinion dated Sep. 27, 2019 for International Application No. PCT/CN2019/073187, filed on Jan. 25, 2019 (6 pages).

Korean office action issued in KR Patent Application No. 10-2021-7027074, dated Apr. 27, 2023, 7 pages. English translation included.

Canadian Office Action issued in CA Patent Application No. 3,127,834, dated Jan. 17, 2023, 4 pages.

Chinese Office Action issued in CN Patent Application No. 201980090161.5, dated Sep. 19, 2022, 12 pages. English translation included.

Chinese Office Action issued in CN Patent Application No. 201980090161.5, dated Jun. 27, 2022, 20 pages. English translation included.

Indian Examination Report issued in IN Patent Application No. 202147035143, dated Feb. 28, 2022, 6 pages.

Japanese Office Action issued in JP Patent Application No. 2021-543161, dated Aug. 26, 2022, 15 pages. English translation included.

Japanese Office Action issued in JP Patent Application No. 2021-543161, dated Mar. 20, 2023, 11 pages. English translation included.

Korean Office Action issued in KR Patent Application No. 10-2021-7027074, dated Sep. 21, 2022, 7 pages. English translation included.

CNIPA, Notification to Complete Formalities of Registration for Chinese Patent Application No. 201980090161.5, mail date: Dec. 5, 2022, 4 pages with unofficial translation.

Japanese notice of allowance issued in JP Patent Application No. 2021-543161, dated Sep. 11, 2023, 4 pages. English translation included.

European Communication pursuant to Article 94(3) EPC issued in EP Patent Application No. 19850182.7, dated Oct. 23, 2023, 6 pages.

Korean notice of allowance issued in KR Patent Application No. 10-2021-7027074, dated Oct. 30, 2023, 9 pages. English translation included.

* cited by examiner

Transmitting a channel state report message that includes at least one of a first field indicative of a value of a parameter or a second field that includes a deviation or a change rate of the parameter.

FIG. 3

Receiving, by a network device, a channel state report message including at least one of a first field indicative of a value of a parameter or a second field that includes a deviation or a change rate of the parameter.

FIG. 4

CHANNEL STATE ESTIMATING AND REPORTING SCHEMES IN WIRELESS COMMUNICATION

CROSS-REFERENCE TO RELATED APPLICATIONS

This application is a continuation of International Patent Application No. PCT/CN2019/073187, filed on Jan. 25, 2019, the contents of which are incorporated herein by reference in their entirety.

TECHNICAL FIELD

This patent document generally relates to systems, devices, and techniques for wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices.

SUMMARY

This document relates to methods, systems, and devices for channel state estimating and reporting schemes in wireless communication. Some implementations of the disclosed technology provide an improved flexibility to meet the need for more various communication scenarios with high mobility and large round-trip time. Some implementations of the disclosed technology can address the issues including the aging of channel state information and signaling overhead.

In one aspect, a wireless communication method is provided to include transmitting, by a communication device, a channel state report message that includes at least one of a first field indicative of a value of a parameter or a second field that includes a deviation or a change rate of the parameter.

In another aspect, a wireless communication method is provided to include receiving, by a network device, a channel state report message including at least one of a first field indicative of a value of a parameter or a second field that includes a deviation or a change rate of the parameter.

In another aspect, a wireless communication apparatus comprising a processor configured to perform the disclosed methods is disclosed.

In another aspect, a computer readable medium having code stored thereon is disclosed. The code, when implemented by a processor, causes the processor to implement a method described in the present document.

The above and other aspects and their implementations are described in greater detail in the drawings, the descriptions, and the claims.

BRIEF DESCRIPTION OF THE DRAWINGS

FIG. 3 shows an example of a channel state estimating and reporting scheme carried on a communication device based on some implementations of the disclosed technology.

FIG. 4 shows an example of a channel state estimating and reporting scheme carried on a network device based on some implementations of the disclosed technology.

DETAILED DESCRIPTION

Figure 1:
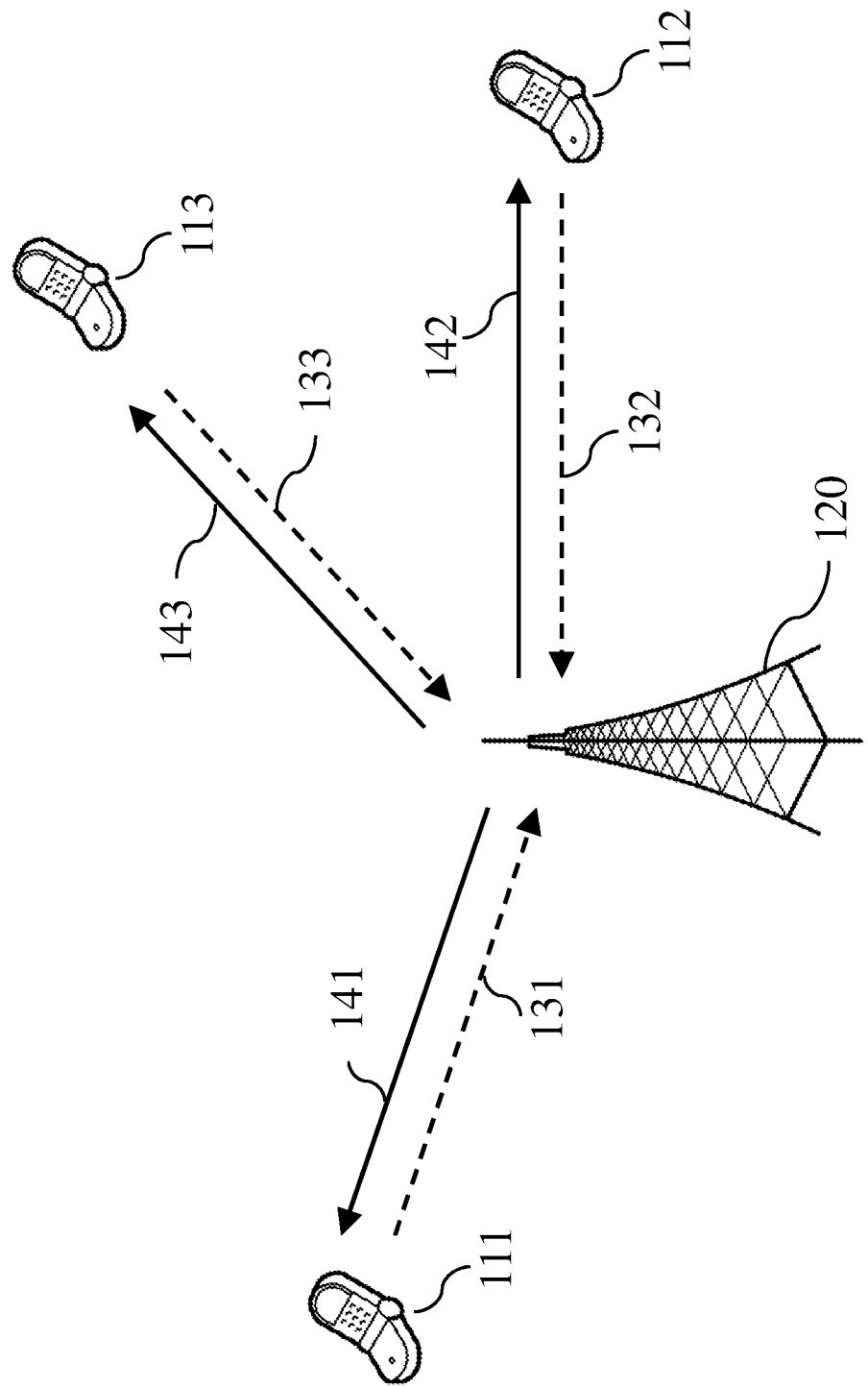
FIG. 1 shows an example of a base station (BS) and a user equipment (UE) in wireless communication based on some implementations of the disclosed technology.

Section headings are used in the present document only to facilitate ease of understanding and scope of the embodiments and techniques described in each section are not only limited to that section. Furthermore, while 5G terminology is used in some cases to facilitate understanding of the disclosed techniques, which may be applied to wireless systems and devices that use communication protocols other than 5G or 3GPP protocols.

The disclosed technology may be used by implementations to provide channel state estimating and reporting schemes in wireless communication. Some implementations of the disclosed technology provide new channel state estimating and reporting schemes in wireless communication which can provide an improved flexibility to support more various scenarios while addressing signaling overhead.

As wireless communication technologies change almost every day, applications in various vertical fields are booming. In order to meet the increasing communication needs, the 5th generation mobile communication (5G, 5th Generation) technology and the further enhancements based on 5G become the development trend for future wireless communications. With the changes in the wireless communication technologies, new scenarios with high mobility and large round trip time (RTT) are presented, which the currently existing mechanisms have limited capabilities to address. For example, in an existing system, for a downlink (DL) transmission, the channel state information (CSI) is obtained based on a dedicated resource, i.e., CSI-RS (CSI reference signal), CRS (cell-specific reference signal), or SSB (SS/PBCH block, for BM only). The reporting and calculation of corresponding content are determined by the configuration information, e.g., CQI in periodic/semi-persistence or aperiodic way.

The current mechanisms, however, face the issues for example, ageing of CSI and RS overhead. First, regarding the aging of CSI, in cases with either high mobility or large RTT, the reported channel state information will be aging for conducting a normal scheduling. For example, with high mobility, channel condition is changed rapidly with varied channel gain and dominant path. Thus, the obtained CSI at time instant t1 will be aging at next time instant t2, which will cause the improper configuration for scheduling, e.g., MCS (Modulation and Coding Scheme) configuration and rank. To handle the aging issue in scenarios with dynamic changes, conducting more dense report in periodic way can be considered. However, such kind of report will lead to high report overhead since redundant information with same report format is sent repeatedly. In scenarios with large RTT, even the mobility is relative lower or normal, after long-time transmission, the received CSI is already expired, which makes difficult to conduct the efficient scheduling.

Second, regarding the RS overhead issue, in an existing solution, the CSI is calculated based on the associated RS, e.g., CSI-RS, SSB, which are dedicated for CSI calculation, even for the CQI updates without changes on the transmission precoding at BS side. To support more frequent reports, multiple triggers of AP RS or more dense transmission of semi/periodic RSs are required, which will cause the greater RS overhead for CSI reports and updates.

In recognition of the issues above, the disclosed technology provides various implementations of channel state estimation and reporting schemes which can provide more flexible and efficient ways of channel state estimating and reporting. Also, the disclosed technology can support new scenarios with high mobility and large RTT, e.g., HST, non-terrestrial communication with satellite.

FIG. 1 shows an example of a wireless communication system (e.g., a 5G or NR cellular network) that includes a BS 120 and one or more user equipment (UE) 111, 112, 113. In some embodiments, the UEs access the BS (e.g., the network) using implementations of the disclosed technology (131, 132, 133), which then enables subsequent communication (141, 142, 143) from the BS to the UEs. The UE may be, for example, a smartphone, a tablet, a mobile computer, a machine to machine (M2M) device, an Internet of Things (IoT) device, and so on.

Figure 2:
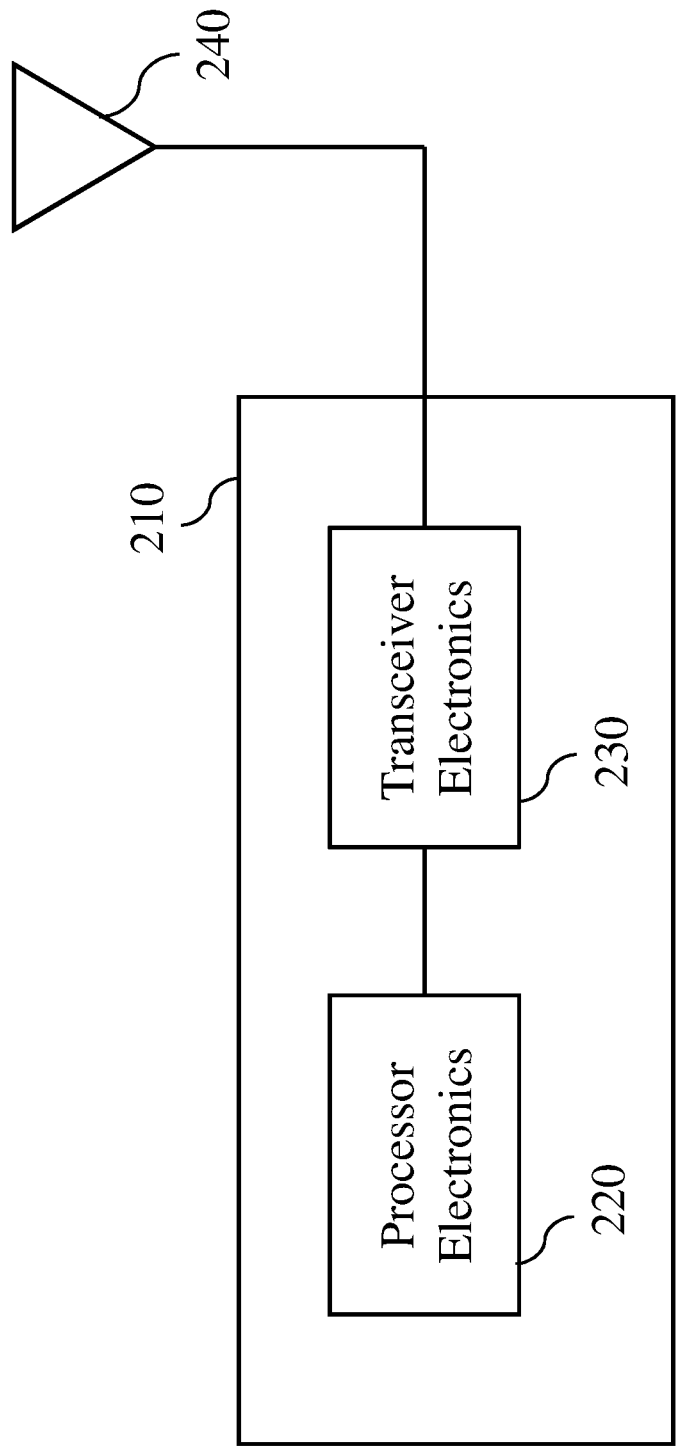
FIG. 2 shows an example of a block diagram of a portion of an apparatus based on some implementations of the disclosed technology.

FIG. 2 shows an example of a block diagram representation of a portion of an apparatus. An apparatus 210 such as a base station or a wireless device (or UE) can include processor electronics 220 such as a microprocessor that implements one or more of the techniques presented in this document. The apparatus 210 can include transceiver electronics 230 to send and/or receive wireless signals over one or more communication interfaces such as antenna 240. The apparatus 210 can include other communication interfaces for transmitting and receiving data. The apparatus 210 can include one or more memories (not explicitly shown) configured to store information such as data and/or instructions. In some implementations, the processor electronics 220 can include at least a portion of transceiver electronics 230. In some embodiments, at least some of the disclosed techniques, modules or functions are implemented using the apparatus 210.

FIG. 3 shows an example of a channel state estimating and reporting scheme carried on a communication device based on some implementations of the disclosed technology. In some implementations, the channel state estimating and reporting scheme includes transmitting, by a communication device, a channel state report message that includes at least one of a first field indicative of a value of a parameter or a second field that includes a deviation or a change rate of the parameter.

FIG. 4 shows an example of a channel state estimating and reporting scheme carried on a network device based on some implementations of the disclosed technology. In some implementations, the channel state estimating and reporting scheme includes receiving, by a network device, a channel state report message including at least one of a first field indicative of a value of a parameter or a second field that includes a deviation or a change rate of the parameter.

The channel state report message can include the channel state report message which includes at least one of the following:

PMI (Precoding Matrix Indicator)
$CQI_0$: Reference CQI (Channel Quality Indication)
$RSRP_0$: Reference RSRP (Reference Signal Received Power)
$SINR_0$: Reference SINR (Signal to Interference and Noise Ratio)
RI (Rank Indicator)
CRI (CSI-RS Resource Index)
SSB (Synchronization Signal Block) Index
$Delta_{CQIx}$: Xth Deviation of CQI
$R_{CQI}$: Change rate of CQI
$Delta_{RSRPx}$: Xth Deviation of RSRPI
$R_{RSRP}$; Change rate of RSRP
$Delta_{SINRx}$; Xth Deviation of SINR
$R_{SINR}$; Change rate of SINR
granularity index for $R_{CQI}$, $R_{RSRP}$, or $R_{SINR}$
granularity value for $R_{CQI}$, $R_{RSRP}$, or $R_{SINR}$ The above parameters can be grouped to either a first field or a second field of the channel state report message. The first field of the channel state report message may include at least one of followings: $CQI_0$, $RSRP_0$, $SINR_0$, PMI, RI, CRI, SSB-Index, or a first granularity indicator. The second field of the channel state report message may include at least one of followings: $Delta_{CQIx}$, $R_{CQI}$, $Delta_{RSRPx}$, $R_{RSRP}$, $Delta_{SINRx}$, $R_{SINR}$, a second granularity indicator, or a mode for the second field calculation. The first granularity indicator or the second granularity indicator can be either the index of value, which is organized in either table or list, or the indicator can be the value. The parameters included in the second field of the channel state report message may correspond to the first field of the channel state report message. The reporting of the first field and the reporting of the second field of the channel state report message can be triggered together via a same channel state reporting configuration or separately via different channel state reporting configurations. The triggering mechanism will be discussed in detail later in this document.

Configuring Channel State Report Message

The configuration of the channel state report message can be performed to include at least one of i) report quantity configuration, ii) report resource configuration and priority rules, or iii) UE capability for CSI calculation and/or report.

Item 1: Report Quantity Configuration

The report quantity configuration is transmitted in response to at least one of a channel state reporting configuration or a trigger of channel state reporting, which is received by a communication device from a network device, for example, BS. In the examples below, the configuration information includes at least one of a deviation of CQI (X deviation CQI(s)) or a change rate of CQI ($R_{CQI}$).

Case 1: Deviation of CQI

The report quantity includes at least a deviation of CQI. In some implementations, the corresponding set(s) of CRI, PMI, RI, $CQI_0$ can be reported together with the deviation of CQI. If there is no reporting on CRI, $CQI_0$, PMI, and RI, the deviation CQI is calculated latest or previously reported PMI/RI/$CQI_0$. In this case, the deviation of CQI refers to the CQI changes based on the latest CQI or the reference CQI ($CQI_0$). In some implementations, the channel state reporting configuration may include one reference CQI ($CQI_0$) and X deviation CQI(s), when X deviation CQI(s) refers to the corresponding PMI/RI/CRI.

Figure 5:
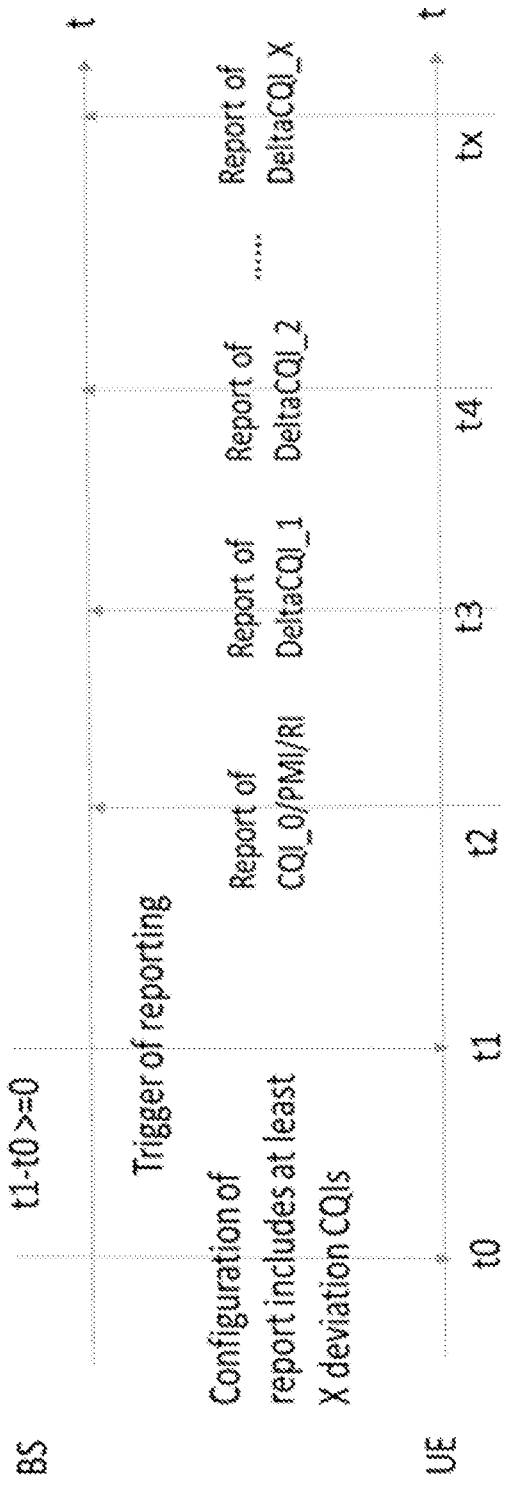
FIG. 5 shows an example of a channel state estimating and reporting scheme when a channel state reporting configuration includes a deviation CQI(s).

FIG. 5 shows an example of a channel state estimating and reporting scheme when the channel state reporting configuration includes a deviation CQI(s). Referring to FIG. 5, at time t0, the BS transmits the channel state reporting configuration including a deviation CQI(s) to the UE. At time t1 (t1≥t0), the channel state report message is triggered by the BS in any of periodic, semi-persistent (semi), or aperiodic (AP). The triggering mechanism can include at least one of the following: 1) The first field and the second field of the channel state report message are triggered either by a single signaling if one channel state reporting configuration contains parameters corresponding to the first field and the second field. 2) The first field and the second field can be triggered by different signaling if parameters corresponding to the first field and the second field belongs to different channel state reporting configurations, respectively. 3) The first field and the second field can be triggered by different signalings if one channel state reporting configuration contains parameters corresponding to the first field and the second field. For the case of iii), the trigger can be done in two steps. For the triggering mechanisms 1) and 3), although all parameters corresponding to the first field and the second field are included within one channel state reporting configuration as report quantity, whether the triggering is done based on a single signaling or different signalings depends on a report type and a scheduling mechanism from the BS. In some implementations in which the report type is periodic, both the first field and the second field will be triggered by a same signaling once it's configured. In some implementations in which the report type is aperiodic, the first DCI can be used to trigger the report of the first field and if necessary, the second level DCI can be used to trigger the report of the second field.

Although now shown in FIG. 5, a mechanism to disable either the first field or the second field of the channel state report message can be provided after the triggering of the channel state report message. In some implementations, when the report type is periodic, for saving the report resource, even if the first field and the second field are triggered together in one signalling, the MAC-CE or DCI can be used to disable the first field or the second field of the channel state report message. In various implementations, the condition to disable one of the first field or the second field of the channel state report message can be set accordingly based on communication scenarios.

In response to the triggering, the UE transmits the channel state report message including at least one of the first field (e.g., reference CQI) or the second field (e.g., a deviation CQI(s)). In some implementations, the report on the first field of the channel state report message and the report on the second field of the channel state report message may be transmitted at a same time. In some implementations, the report on the first field of the channel state report message and the report of the second field on the channel state report message may be transmitted at different times. To report the first field and the second field at different times, time offsets may be configured such that time requirement on calculation/report of the first field and the second field of the channel state report message is satisfied. In a specific example as shown in FIG. 5, the report of the first field of the channel state report message and the report of the second field of the channel state report message are transmitted at different times. In addition, in FIG. 5, the report on the second field of the channel state report messages is transmitted at different times.

As shown in FIG. 5, at time t2, the UE transmits the first field of the channel state report message which includes at least one of CQI_0, PMI, RI. At time t3 which is obtained from the equation, t2+Δt*1, the UE transmits the second field of the channel state report message, Delta CQI_1. At time t4 which is obtained from the equation, t2+Δt*2, the UE transmits the second field of the channel state report message, Delta CQI_2. At time t, which is obtained from the equation, t2+Δt*x, the UE transmits the second field of the channel state report message, Delta CQI_X. In this example, Δt refers to the report preconfigured time offset indicating time distance between two adjacent transmissions on the report of deviation CQI.

The second field calculation, for example, calculating the deviation CQI, DeltaCQI_x, can be performed by using at least one of Equation 1 (for mode 1) or Equation 2 (for mode 2):

$$\text{Delta\_CQI\_}x = CQI_{measurNew} - CQI_0 \quad \text{[Equation 1]}$$

$$\text{Delta\_CQI\_}x = CQI_{measurNew} - (\Sigma_{i=1}^{i=x-1} \text{Delta}_{CQI_i} + CQI_0) \quad \text{[Equation 2]}$$

In Equations 1 and 2, the $CQI_{measureNew}$ refers to the latest calculated CQI at the UE side before the reporting of $\text{Delta}_{CQIx}$ based on values of the corresponding PMI/RI/CRI. In some implementations, the CQI measureNew is calculated after the latest reporting with gap $\Delta t\_z1$ and before the instant of reporting of $\text{Delta}_{CQIx}$ with gap $\Delta t\_z2$. In some implementations, the $CQI_0$ and $\text{Delta}_{CQIx}$ will be quantized by different granularity and bit length. In some implementations, the bit length for $\text{Delta}_{CQIx}$ is smaller than $CQI_0$.

Case 2: Change Rate of CQI

The report quantity includes at least a change rate of CQI ($R_{CQI}$). In some implementations, the corresponding set(s) of CRI, CQI, PMI and RI can be also reported together with $R_{CQI}$. If there is no reporting on the corresponding set(s), the deviation CQI is calculated latest or previously reported PMI/RI/CQI. In this case, $R_{CQI}$ is calculated latest or previously reported PMI/RI/CQI with time granularity $G_t$ or frequency granularity Gf.

For the determination of granularity, at least one of following ways can be considered:

1. The granularity may be configured by the BS with L values (L>=1). If more than one values are configured (i.e., L>1), the UE will select one of them and report the selected index together with either the CRI/CQI/PMI/RI or $R_{CQI}$. If only one value is configured (i.e., L=1), the UE does not need to report its value.

2. The granularity may be configured from the predefined table with L values (L>1). In this case, the UE will select one of values based on the signaling from the BS.

3. When there is no pre-configured value, the UE will determine the value by itself and directly report the determined value to the BS.

With the granularity determined, the second field calculation, for example, calculating the change rate of CQI can be performed by using, for example, Equation 3 (for mode 1):

$$R_{CQI} = (CQI_{measurNew} - CQI_0)/\text{granularity} \quad \text{[Equation 3]}$$

In Equation 3, the $CQI_{measureNew}$ refers to the latest calculated CQI at the UE side before the reporting of $R_{CQI}$ based on values of the corresponding PMI/RI/CRI. In some implementations, the $CQI_{measureNew}$ is calculated after the latest reporting with gap $\Delta t\_z1$ and before the instant of reporting of $\text{Delta}_{CQI}$ with gap $\Delta t\_z2$. In some implementations, the $CQI_0$ and $R_{CQI}$ will be quantized by different granularity and bit length. In some implementations, the bit length for $R_{CQI}$ is smaller than $CQI_0$. In some embodiments, the granularity refers to the certain time duration or frequency unit, which is used to assess the variation of a parameter, e.g., CQI over given time duration or frequency unit. In some embodiments, multiple granularities can also be determined. In this case, each of the granularities corresponds to different domain, e.g., time or frequency domain. The determination of the granularity can be made either by the configuration or the UE selection.

Once the report is triggered in any of periodic/semi/AP, the content of the required report, e.g., including the parameters (e.g., reference CQI and $R_{CQI}$) will be reported at either different times or a same time.

Figure 6:
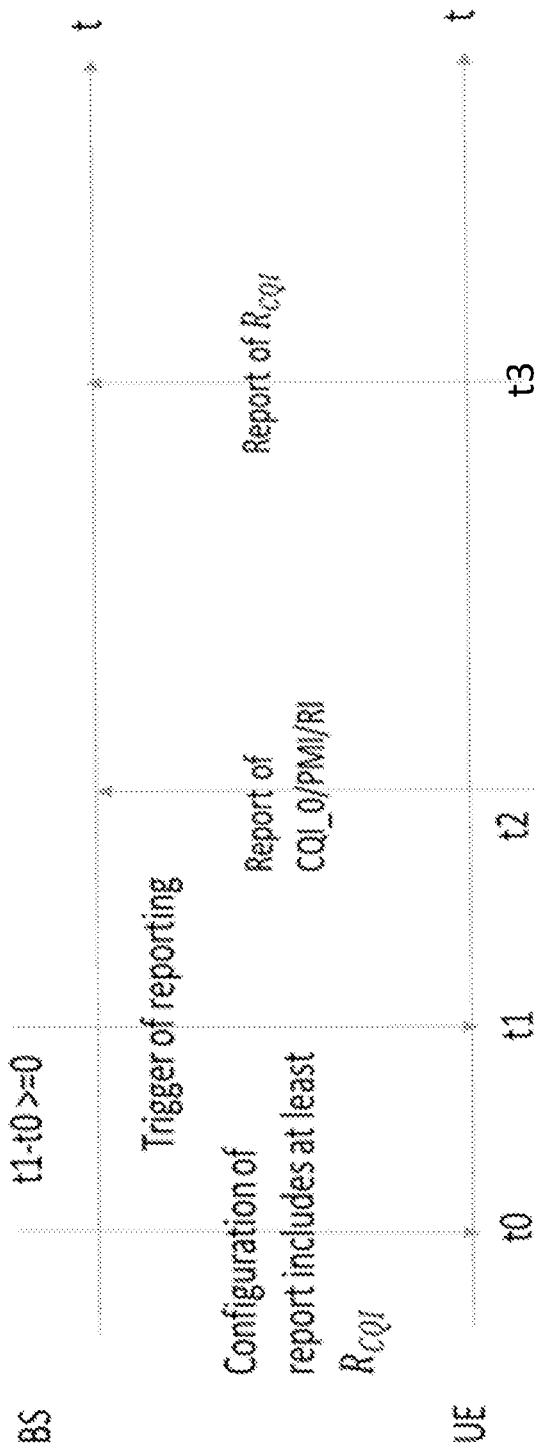
FIG. 6 shows an example of a channel state estimating and reporting scheme when a channel state reporting configuration includes a change rate of CQI.

FIG. 6 shows an example of a channel state estimating and reporting scheme when a channel state reporting configuration includes $R_{CQI}$. In FIG. 6, at time t0, the BS transmits the channel state reporting configuration including at least $R_{CQI}$ to the UE. At time t1 (t1≥t0), the configuration is triggered by the BS in any of periodic, semi, or AP. The triggering mechanism is already explained with reference to FIG. 5 and the similar explanations can be applied here. In response to the triggering, at time t2, the UE transmits the reporting of the first field of the channel state report message which includes at least one of CQI_0, PMI, RI. At time t3 which is obtained from the equation, t2+Δt, the UE transmits the second field of the channel state report message which includes $R_{CQI}$. Thus, in the specific implementation as shown in FIG. 6, reference CQI and $R_{CQI}$ are reported at different times, t2 and t3. As mentioned for the example as shown in FIG. 5, to report the first field and the second field at different times, time offsets may be configured such that time requirement on calculation/report of the first field and the second field of the channel state report message is satisfied. In some implementations, the preconfigured report offset Δt is greater than $G_r$.

Figure 7:
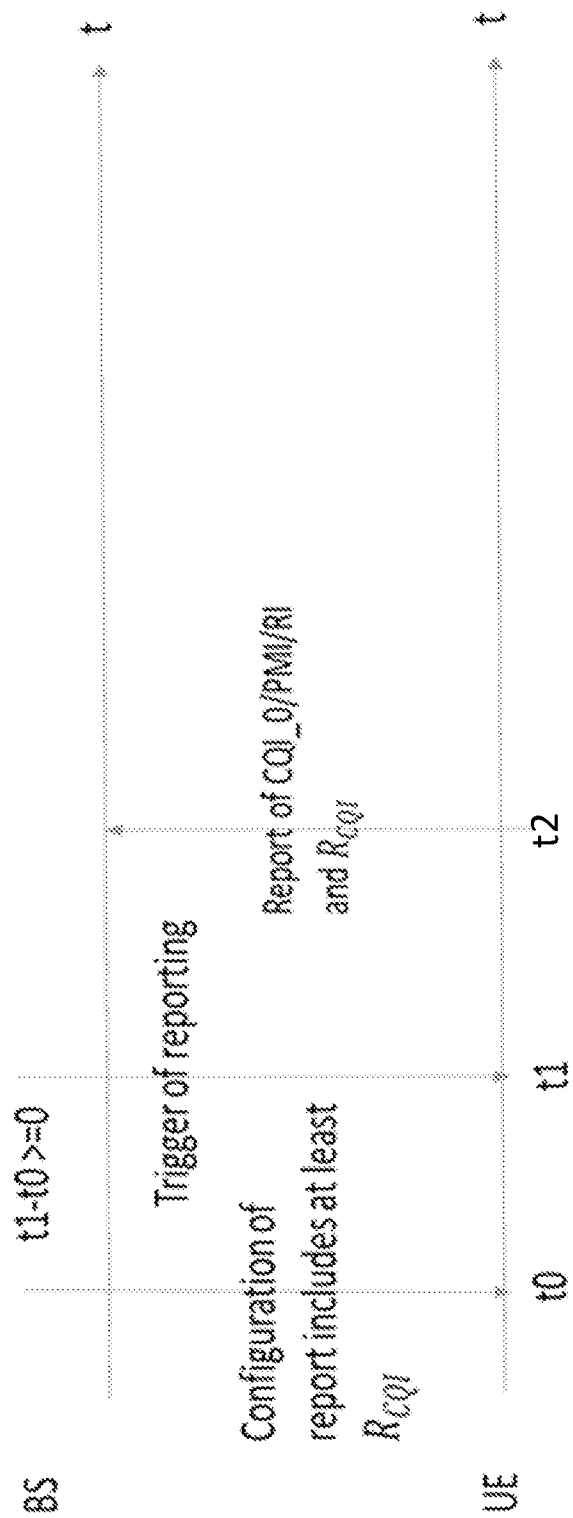
FIG. 7 shows another example of a channel state estimating and reporting scheme when a channel state reporting configuration includes a change rate of CQI.

FIG. 7 shows another example of a channel state estimating and reporting scheme when a channel state reporting configuration includes $R_{CQI}$. In FIG. 7, at time t0, the BS transmits the channel state reporting configuration includes at least $R_{CQI}$ to the UE. At time t1 (t1≥t0), the configuration is triggered by the BS in any of periodic, semi, or AP. The triggering mechanism is already explained with reference to FIG. 5 and the similar explanations can be applied here. In response to the triggering, at time t2 which is obtained from the equation, t1+Δt, the UE transmits the reporting of the first field of the channel state report message which includes at least one of CQI_0, PMI, RI and the second field of the channel state report message which includes $R_{CQI}$. Thus, in the specific implementation as shown in FIG. 6, reference CQI and $R_{CQI}$ are reported at the same time, t2. In some implementations, the preconfigured report offset Δt is greater than $G_r$.

In some implementations, $R_{CQI}$ can be calculated by considering difference(s) of CQI in time instants with the gap $G_r$. Filtering for multiple values can be considered as one solution. In some implementations, the valid duration of the parameters, e.g., reference CQI and $R_{CQI}$, can also be reported by the UE according to the channel state reporting configuration. Once the timer is expired or exceeds the window of the validation, the UE will either update the value by another reporting or the BS should trigger another round of reporting.

In examples of Cases 1 and 2, the two modes, Mode 1 and Mode 2, for the calculation of the deviation of CQI, and one mode, Mode 1, for the calculation of the change rate of CQI, have been discussed. The mode for the second field calculation, for example, Mode 1 and Mode 2 for calculating the deviation of CQI and Mode 1 for calculating the change rate of CQI, can be included in the second field. The mode for the second field calculation can be determined in at least one of the following manners:

1. In the channel state reporting configuration, the report quantity, e.g., at least the second field of the channel state report message, is configured together with the mode for the second field calculation.

2. In the channel state reporting configuration, the report quantity, e.g., at least the second field of the channel state report message, is configured. The UE will select the mode for the second field calculation.

In some implementations, the mode selection can be further extended to define a channel state report mechanism considering the potential usage of AI (artificial intelligence). In this case, the CSI report mechanism will include at least one of the following:

1. Calculation mode. The calculation mode is used to determine how to calculate the channel state information. For the calculation mode, one or more modes are indexed with at least one of the corresponding set of input parameters and output parameters. Here, the output parameters can be content of the channel state report message, e.g., the first field and/or the second field and/or extracted parameters to modeling the channel condition, e.g., Doppler spread, Doppler shift, delay spread, delay shift. The input parameters can include, for example, granularity for calculation (e.g., frequency band-width including wideband or subband or frequency range or time duration), filtering parameters for CSI smoothing or weights or RS index, e.g., RS configuration/mode index, for calculation. Optionally, a method index can also be one of input parameters if multiple methods are explicitly defined in the spec for one calculation mode. In some implementations, the mapping between the method index and the calculation mode is one to one. In some implementations, only required parameters are explicitly mentioned and the methods for the second field calculation is not defined, just for implementation.

2. Report mode. The report mode is used to determine at least one of them: 1. how to report the channel state information e.g., periodic/or AP 2. The resource for reporting, e.g., single report or separately report of the channel state report message.

3. Content for reporting,

4. Granularity for reporting, e.g., wideband or sub-band.

For the calculation mode, the configuration of resource for channel state information calculation can also be included. Moreover, the calculation mode can be a part of the configuration of the report mode or can be independent from the configuration of the report mode. Optionally, if the calculation mode will be a part of the report mode, the index of calculation will be a part of content of the report mode.

In some implementations, if the report type is periodic, the calculation mode can be a part of the configuration of the report mode. Otherwise, the calculation mode is independent from the configuration of the report mode.

Figure 8:
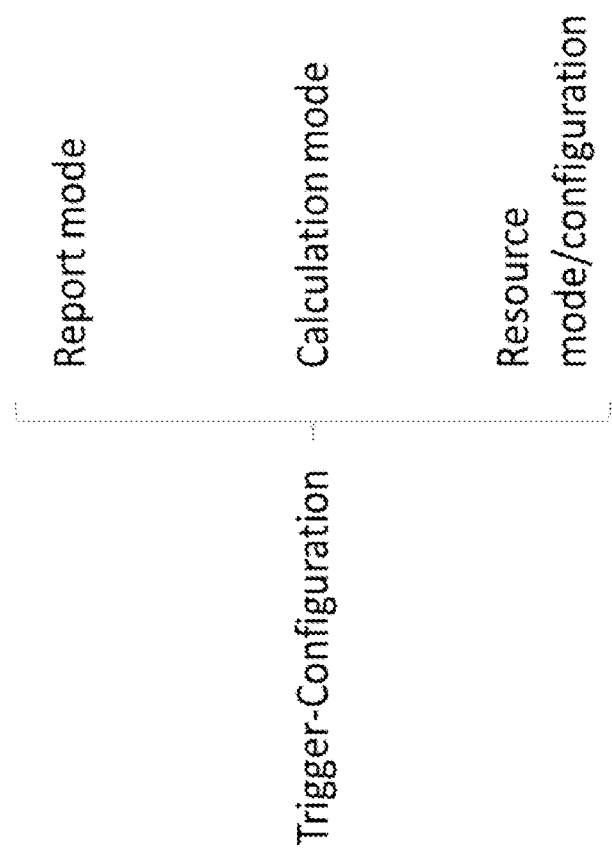
FIG. 8 shows an example of a framework for a CSI trigger configuration based on some implementations of the disclosed technology.

The triggering mechanism, e.g., timing and signaling, for the calculation mode and the report mode can also be same or different. FIG. 8 illustrates an example of a framework for CSI trigger configuration. As shown in FIG. 8, the association among the calculation mode, the resource mode/configuration, and the report mode will be done within the corresponding triggering configuration, e.g., indexes of these modes, and the configuration will be a part of the content of triggering configuration.

In examples of Cases 1 and 2, the parameter CQI is used such that the deviation of CQI is transmitted in Case 1 and the change rate of CQI is transmitted in Case 2. In some implementations, other parameter such as RSRP or SINR can be used instead of CQI. Most explanations for Case 1 are applied to Cases 3 and 5 and most explanations for Case 2 are applied to Cases 4 and 6 by replacing the parameter of CQI with the parameter of RSRP or SINR.

Case 3: Deviation of RSRP

Figure 9:
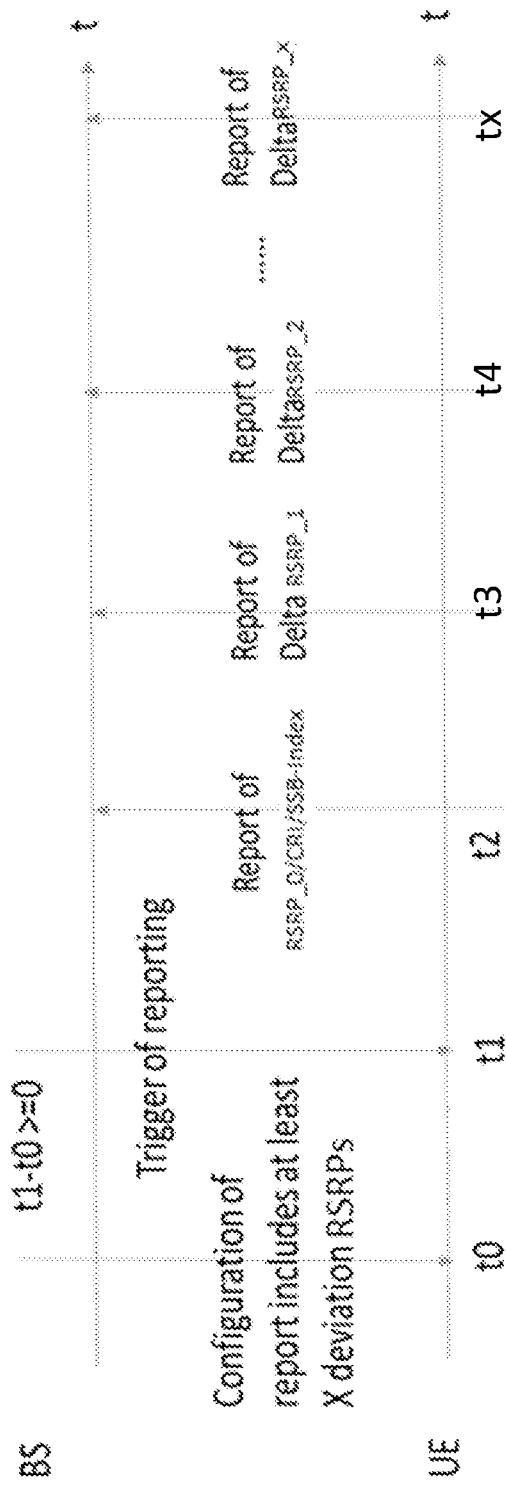
FIG. 9 shows an example of a channel state estimating and reporting scheme when a channel state reporting configuration includes a deviation RSRP.
Figure 10:
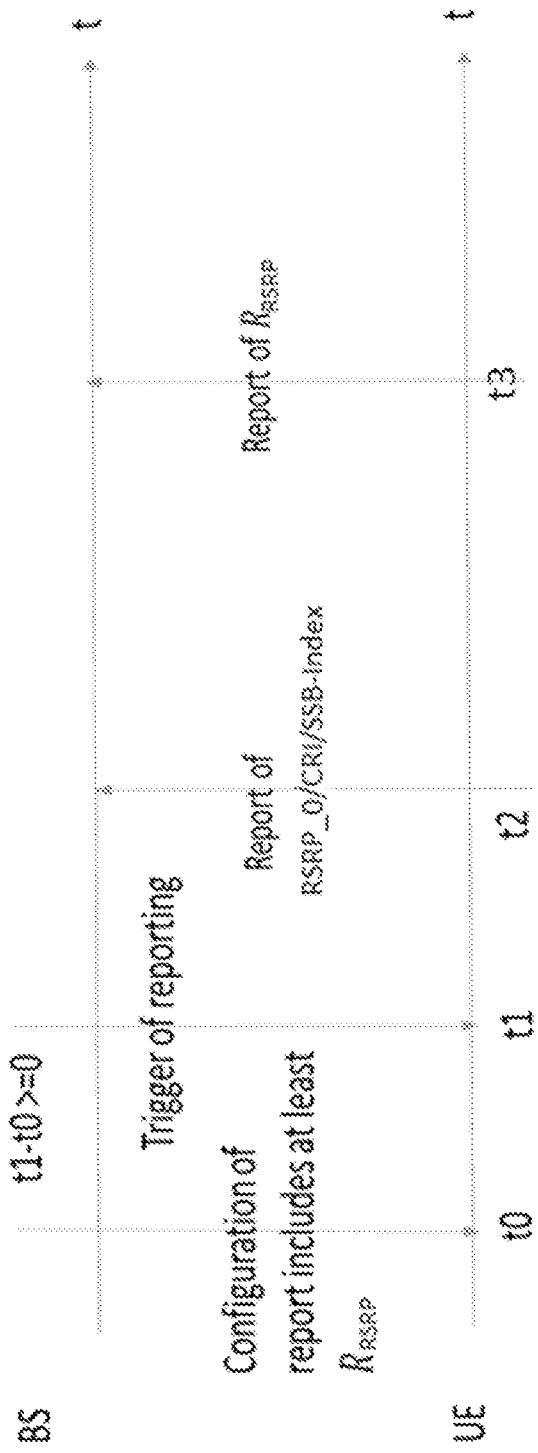
FIG. 10 shows an example of a channel state estimating and reporting scheme when a channel state reporting configuration includes a change rate of RSRP.

FIG. 9 shows an example of a channel state estimating and reporting scheme when a channel state reporting configuration includes a deviation RSRP. The process proceeds similarly as the configuration and operation for CQI in Case 1. In this case, the deviation of RSRP can be configured together with the report of CRT or SSB-index Case 4: Change Rate of RSRP FIG. 10 shows an example of a channel state estimating and reporting scheme when a channel state reporting configuration includes a change rate of RSRP. The process proceeds similarly as the configuration and operation for CQI in Case 2. In this case, the change rate of RSRP can be configured together with the report of CRT or SSB-index. Although FIG. 9 shows the example that the report of the first field (e.g., RSRP_0/CRI/SSB-Index) and the report of the second field (e.g., $R_{RSRP}$) are transmitted at different times, it's also possible that the first field and the second field are transmitted at a same time.

Case 5: Deviation of SINR

Figure 11:
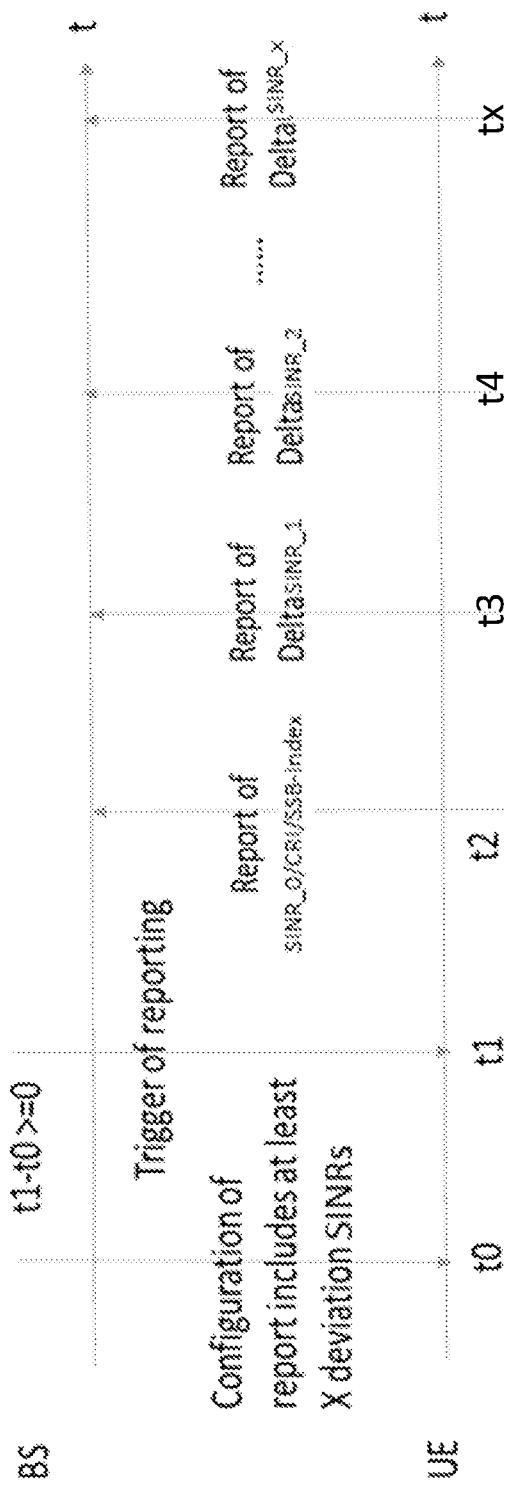
FIG. 11 shows an example of a channel state estimating and reporting scheme when a channel state reporting configuration includes a deviation SINR.
Figure 12:
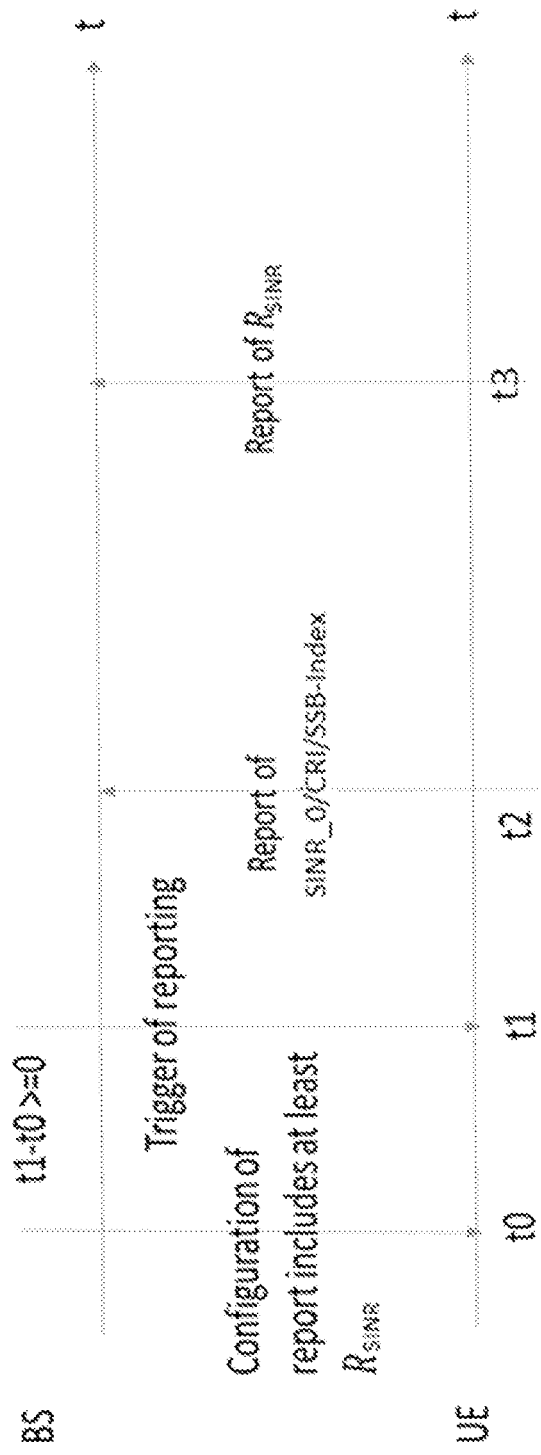
FIG. 12 shows an example of a channel state estimating and reporting scheme when a channel state reporting configuration includes a change rate of SINR.

FIG. 11 shows an example of a channel state estimating and reporting scheme when a channel state reporting configuration includes a deviation SINR. The process proceeds similarly as the configuration and operation for CQI in Case 1. In this case, the deviation of SINR can be configured together with the report of CRT or SSB-index Case 6: Change Rate of SINR FIG. 12 shows an example of a channel state estimating and reporting scheme when a channel state reporting configuration includes a change rate of SINR. The process proceeds similarly as the configuration and operation for CQI in Case 2. In this case, the change rate of SINR can be configured together with the report of CRT or SSB-index. Although FIG. 11 shows the example that the report of the first field (e.g., SINR_0/CRI/SSB-Index) and the report of the second field (e.g., $R_{SINR}$) are transmitted at different times, it's also possible that the first field and the second field are transmitted at a same time.

For Cases 1 to 6, it is noted that 1) the CQI/RSRP/SINR in the first field of the channel state report message is calculated based on corresponding PMI/RI/CRI/SSB index listed in the first field of the channel state report message or previously reported and 2) the second field of the channel state report message is calculated based on the corresponding value listed in the item 1) above. If multiple sets of CQI/RSRP/SINR and PMI/RI/CRI/SSB are required in the first field, one to one mapping between the first field and the second field of the channel state report message can be followed. In some implementations, a policy to report multiple sets of 1st CQI can include: different sets of "PMI and/or RI and/or CQI and/or CRT" for different frequency band or for optimal and sub-optimal results. Optimal PMI and adjacent PMI, here adjacent refers to the represented spatial direction of precoder matrix is similar. In some embodiment, the number of sets can also be indicated by network device.

Item 2: Report Resource Configuration and Priority Rules

Case 1: Report Resource Configuration

To support the channel state report message including at least one of the first field and the second field of the channel state report message, different time offsets for the report of each field can be configured. Each component will be carried by either PUCCH (Physical Uplink Control Channel) or PUSCH (Physical Uplink Shared Channel), which satisfy the time restriction between the offsets, CSI calculation, and resource preparation. In some embodiment, the time offset refers to the offset within one period, e.g., slot offset or symbol offset within the a report period cross over multiple slots or symbols. In some embodiment, the time offsets refers to the time offset between the report and the reception of CSI report triggering.

In some implementations, the BS can indicate one or more resources for calculating channel state information, the one or more resources including any one of DM-RS (Demodulation Reference Signal), CSI-RS (CSI Reference Signal) for CSI, or CSI-RS for tracking. In some implementations, the one or more resources for calculating channel state information can be indicated to satisfy at least one of i) a same resource or different resources are indicated for the first field and the second field, ii) DM-RS (Demodulation Reference Signal) is used for the second field, or iii) a power offset among the one or more resources is configured if different resources are indicated for the first field and the second field.

Case 2: Priority Rule

At least one of the following rules can be set to support the channel state report message including at least one of the first field and the second field of the channel state report message.

Rule-1: the first field of the channel state report message is prioritized than the corresponding second field of the channel state report message.

Rule-2: In case of the reporting of multiple sets of channel state report message, the second field of the ith set of channel state report message is prioritized than the jth set of channel state report message, here i<j.

Rule-3: The reports triggered in different ways obey the following priority order: AP>Semi>P.

Rule-4: The channel state report message for wideband is prioritized than the results for subband Rule-5: In the second field of the channel state report message, e.g., DeltaCQI_x/Delta_RSRP/Delta_SINR, if the kth value of DeltaCQI_x/Delta_RSRP/Delta_SINR and the lth value of DeltaCQI_x/Delta_RSRP/Delta_SINR will be reported in the same resource (i.e., same PUSCH/PUCCH), the kth value of DeltaCQI_x/Delta_RSRP/Delta_SINR will be dropped, here l>k;

Rule-6: In the second field of the channel state report message, e.g., DeltaCQI_x/Delta_RSRP/Delta_SINR, if the kth value of DeltaCQI_x/Delta_RSRP/Delta_SINR and the lth value of DeltaCQI_x/Delta_RSRP/Delta_SINR will be reported in the different resources (e.g., PUSCH and PUCCH) but within same scheduling unit for transmission (e.g., slot), the kth value of DeltaCQI_x/Delta_RSRP/Delta_SINR will be dropped, here l>k;

Rule-7: If the processing on the first channel state report message and/or the second channel state report message will be stopped, another reporting on the first channel state report message is triggered unless there is another indication for keeping such kind of parallel processing from BS, and within the UE capability.

Item 3: UE Capability for Channel State Calculation and/or Report

Case 1: The UE reports whether the UE support the channel state calculation and report which is suggested in this patent document. If the UE does not support it, the configuration will not be enabled for the UE.

Case 2: if the required resource for supporting the calculation and the report which is suggested in this patent document exceeds the available resource/unit in time instant or duration, the channel state report message will be dropped according to the pre-defined priority rules defined as Rule-2.

Implementation: Configuration of Resource for Reporting

In this example, to support the channel state report message including at least one of the first field and the second field, the associated resource for calculating, for example, the second field, includes the DM-RS (Demodulation Reference Signal) which is assigned for the PDSCH (Physical Downlink Shared Channel) transmission via either DCI (Downlink Control Information) for dynamic scheduling or RRC (Radio Resource Control) configuration for a configured grant. In addition, the following examples can be implemented.

Case 1: For the channel state reporting with the report quantity configuration including the first field and the second field of the channel state report message, different resources can be configured for the channel state calculations of the first field and the second field. For example, CSI-RS or SSB is configured in the configuration for the first field and DM-RS is indicated via either configuration or pre-defined rule to obtain the second field of the channel state report message. The resource for the first field of the channel state report message can be transmitted by the BS or received by the UE prior to the RSs for the second field of the channel state report message.

Case 2: For the channel state reporting with the report quantity configuration including only the second field of the channel state report message, DM-RS is indicated via either configuration or pre-defined rule to obtain the second field of channel state report message. If the channel state reporting is triggered in AP, the bits for the channel state reporting need to be within a same DCI as the scheduling bits for PDSCH and DM-RS assignment. The indication of DM-RS to obtain the second field of the channel state report message can be done in any one of following ways:

1) Configuration: In the channel state reporting configuration, a set of DM-RS index(s) (e.g., port index) will be configured via RRC or MAC CE signaling. Once the scheduling is done, the calculation of second field of the channel state report message is performed based on the DM-RS indexes according to the scheduled transmission.

2) Pre-defined rule: No dedicated signaling for RS configuration associated to the report configuration exists. Once the channel state reporting is triggered, the UE will try to obtain the second field of the channel state report message based on the DM-RS which is assigned for the PDSCH transmission.

The power offset between RSs for the first field and the second field of the channel state report message can also be indicated via signaling delta_P for assisting the CSI calculation if different RSs are adopted.

Additional features and embodiments the above-described methods/techniques discussed above are described below using a clause-based description format.

1. A wireless communication method including: transmitting, by a communication device, a channel state report message that includes at least one of a first field indicative of a value of a parameter or a second field that includes a deviation or a change rate of the parameter.

2. The wireless communication method of clause 1, wherein the channel state report message is transmitted in response to a channel state reporting configuration received by the communication device from a network device or a trigger of channel state reporting received by the communication device from a network device.

3. The wireless communication method of clause 2, wherein the trigger of channel state reporting is performed by using a single signaling or multiple signaling based on the channel state reporting configuration.

4. The wireless communication of clause 1, wherein the value of the parameter includes a value of CQI (Channel Quality Indication), a value of RSRP (Reference Signal Received Power), or a value of SINR (Signal to Interference and Noise Ratio), the deviation or the change rate of the parameter includes a deviation or a change rate of CQI, RSRP, or SINR.

5. The wireless communication method of clause 1, wherein the first field further includes at least one of PMI (Precoding Matrix Indicator), RI (Rank Indicator), CRI (CSI-RS Resource Index), SSB (Synchronization Signal Block) index, or a first granularity indicator, and the second field further includes a second granularity indicator, or a mode for calculating the second field.

6. The wireless communication method of clause 5, wherein at least one of the first granularity indicator or the second granularity indicator is configured by a network device, or configured from a predefined table, or determined by the communication device from the predefined table.

7. The wireless communication method of clause 1, further comprising calculating the second field by a calculation mode determined by either a channel state reporting configuration received by the communication device from a network device, predefined, or selected by the communication device from pre-defined candidate sets.

8. The wireless communication method of clause 7, wherein the calculation mode is defined by using at least one of:

$$P_{measurNew} - P_0. \quad \text{Equation 1:}$$

$$P_{measurNew} - (\Sigma_{i=1}^{i=x-1} \text{Delta}_{P_i} + P_0), \text{ or} \quad \text{Equation 2:}$$

$$(P_{measurNew} - P_0)/\text{granularity}, \quad \text{Equation 3:}$$

wherein $P_{measureNew}$ refers to a value of the parameter latest obtained at the communication device and $P_0$ refers to the value of the parameter, and wherein the Equation 1 and the Equation 2 are defined to calculate xth deviation of the parameter in a first mode and a second mode, respectively, and the Equation 3 is defined to calculate the change rate of the parameter in a third mode.

9. The wireless communication method of clause 1, wherein the first field and the second field are transmitted at a same time.

10. The wireless communication method of clause 1, wherein the first field and the second field are transmitted at different times with time offsets satisfying time requirement for transmitting the channel state report message, time offsets corresponding to the first field and the second field, respectively.

11. The wireless communication method of clause 1, further comprising configuring a resource for transmitting the channel state report message, wherein different resources are configured for the first field and the second field, respectively.

12. The wireless communication method of clause 1, wherein at least one of the first field or the second field is transmitted by PUCCH (Physical Uplink Control Channel) or PUSCH
(Physical Uplink Shared Channel).

13. The wireless communication method of clause 1, further comprising transmitting the channel state report message, by the communication device, according to a priority rule configured by a network device or pre-defined.

14. The wireless communication method of clause 13, wherein the priority rules includes at least one of: i) the first field of the channel state report message is prioritized than the corresponding second field of the channel state report message, iii) when the wireless method communication method further includes transmitting additional channel state report messages, the second field of the ith set channel state report message is prioritized than the jth set of channel state report message, wherein i and j are natural numbers which satisfy i<j, iii) a trigger of channel state reporting has a priority order of aperiodic>semi-persistence>periodic, iv) the channel state report message for a wideband is prioritized than that for a subband, v) if the kth value and the lth value in the second field of the channel state report message are reported in a same resource, the kth value is dropped wherein k and l are natural numbers which satisfy l>k, vi) if the kth value and the lth value in the second field of the channel state report message are reported in different resources and within a same transmission unit, the kth value is dropped wherein k and l are natural numbers which satisfy l>k, or vii) when the wireless method communication method further includes transmitting an additional channel state report message, if processing on the channel state report message or the additional channel state report message is stopped, the channel state report message is triggered again.

15. The wireless communication method of clause 1, further comprising reporting a capability of the communication device, the capability indicating whether the communication device supports the channel state report message including at least one of the first field or the second field.

16. The wireless communication method of clause 1, further comprising obtaining the second field based on one of DM-RS (Demodulation Reference Signal), CSI-RS (CSI Reference Signal) for CSI, or CSI-RS for tracking.

17. A wireless communication method including receiving, by a network device, a channel state report message including at least one of a first field indicative of a value of a parameter or a second field that includes a deviation or a change rate of the parameter.

18. The wireless communication method of clause 17, wherein the value of the parameter includes a value of CQI (Channel Quality Indication), a value of RSRP (Reference Signal Received Power), or a value of SINR (Signal to Interference and Noise Ratio), the deviation or the change rate of the parameter includes a deviation or a change rate of CQI, RSRP, or SINR.

19. The wireless communication method of clause 18, wherein first field further includes at least one of PMI (Precoding Matrix Indicator), RI (Rank Indicator), CRI (CSI-RS Resource Index), SSB (Synchronization Signal Block) index, or a first granularity indicator, and the second field further includes a second granularity indicator, or a mode for calculating the second field.

20. The wireless communication method of clause 19, wherein at least one of the first granularity indicator or the second granularity indicator is configured by the network device, or configured from a predefined table, or determined by a user device from the predefined table.

21. The wireless communication method of clause 17, further comprising transmitting, by the network device, to a user device, at least one of a channel state reporting configuration or a trigger of channel state reporting.

22. The wireless communication method of clause 17, further comprising notifying a user device any one of first to third modes for calculating the second field by one of Equations 1 to 3, respectively, wherein the Equations 1 to 3 are defined as follows:

$$P_{measurNew} - P_0, \quad \text{Equation 1:}$$

$$P_{measurNew} - (\Sigma_{i=1}^{i=x-1} \text{Delta}_{P_i} + P_0), \text{ or} \quad \text{Equation 2:}$$

$$(P_{measurNew} - P_0)/\text{granularity}, \quad \text{Equation 3:}$$

wherein $P_{measureNew}$ refers to a value of the parameter latest obtained at the user device and $P_0$ refers to the value of the parameter, and wherein the Equation 1 and the Equation 2 are defined to calculate xth deviation of the parameter in the first mode and the second mode, respectively, and Equation 3 is defined to calculate the change rate of the parameter in the third mode.

23. The wireless communication method of clause 22, wherein the first field and the second field are quantized by different granularities and bit lengths, the second field having a bit length smaller than that of the first field.

24. The wireless communication method of clause 17, wherein the first field and the second field are received at a same time.

25. The wireless communication method of clause 17, wherein the first field and the second field are received at different times with different time offsets satisfying time requirement for transmitting the channel state report message, time offsets corresponding to the first field and the second field, respectively.

26. The wireless communication method of clause 17, wherein at least one of the first field or the second field is transmitted by PUCCH (Physical Uplink Control Channel) or PUSCH (Physical Uplink Shared Channel).

27. The wireless communication method of clause 17, further comprising indicating one or more resources for calculating the channel state report message, the one or more resources including any one of DM-RS (Demodulation Reference Signal), CSI-RS for CSI, or CSI-RS for tracking.

28. The wireless communication method of clause 17, further comprising indicating one or more resources for calculating the channel state report message, wherein the one or more resources satisfy at least one of i) a same resource or different resources are indicated for the first field and the second field, ii) DM-RS (Demodulation Reference Signal) is used for the second field, or iii) a power offset among the one or more resources is configured if different resources are indicated for the first field and the second field.

29. A wireless communications apparatus comprising a processor and a memory, wherein the processor is configured to read code from the memory and implement a method recited in any of claims 1 to 28.

30. A computer program product comprising a computer-readable program medium code stored thereupon, the code, when executed by a processor, causing the processor to implement a method recited in any of claims 1 to 28.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method including:
   transmitting, by a communication device, a channel state report message that includes at least one of a first field indicative of a value of a parameter or a second field that includes a deviation or a change rate of the parameter, and
   wherein the channel state report message is transmitted in response to a trigger of a channel state reporting received by the communication device from a network device,
   wherein the channel state report message is transmitted according to a priority rule configured by the network device or pre-defined, wherein priority rules includes at least one of: i) the first field of the channel state report message is prioritized than a corresponding second field of the channel state report message, ii) when the wireless communication method further includes transmitting additional channel state report messages, the second field of an ith set channel state report message is prioritized than a jth set of channel state report message, wherein i and j are natural numbers which satisfy i<j, iii) the trigger of the channel state reporting has a priority order of aperiodic>semi-persistence>periodic, iv) the channel state report message for a wideband is prioritized than that for a subband, v) if a kth value and a lth value in the second field of the channel state report message are reported in a same resource, the kth value is dropped wherein k and l are natural numbers which satisfy l>k, vi) if the kth value and the lth value in the second field of the channel state report message are reported in different resources and within a same transmission unit, the kth value is dropped wherein k and l are natural numbers which satisfy l>k, or vii) when the wireless communication method further includes transmitting an additional channel state report message, if processing on the channel state report message or the additional channel state report message is stopped, the channel state report message is triggered again.

2. The wireless communication method of claim 1, wherein the trigger of the channel state reporting is performed by using a single signaling or multiple signaling based on a channel state reporting configuration received by the communication device from the network device.

3. The wireless communication method of claim 1, wherein the value of the parameter includes a value of CQI (Channel Quality Indication), a value of RSRP (Reference Signal Received Power), or a value of SINR (Signal to Interference and Noise Ratio).

4. The wireless communication method of claim 1, wherein the first field includes a first granularity indicator, and the second field includes a second granularity indicator, and wherein at least one of the first granularity indicator or the second granularity indicator is configured by the network device, or configured from a predefined table, or determined by the communication device from the predefined table.

5. The wireless communication method of claim 1, further comprising calculating the second field by a calculation mode determined by a channel state reporting configuration received by the communication device from the network device, predefined, or selected by the communication device from pre-defined candidate sets.

6. The wireless communication method of claim 5, wherein the calculation mode is defined by using at least one of:

$$P_{measurNew} - P_0, \quad \text{Equation 1:}$$

$$P_{measurNew} - (\Sigma_{i=1}^{i=x-1} \text{Delta}_{Pi} + P_0), \text{ or} \quad \text{Equation 2:}$$

$$(P_{measurNew} - P_0)/\text{granularity}, \quad \text{Equation 3:}$$

wherein $P_{measureNew}$ refers to a value of the parameter latest obtained at the communication device and $P_0$ refers to the value of the parameter, and wherein the Equation 1 and the Equation 2 are defined to calculate xth deviation of the parameter in a first mode and a second mode, respectively, and the Equation 3 is defined to calculate the change rate of the parameter in a third mode.

7. The wireless communication method of claim 1, wherein the first field and the second field are transmitted at different times with time offsets satisfying time requirement for transmitting the channel state report message, the time offsets corresponding to the first field and the second field, respectively.

8. The wireless communication method of claim 1, further comprising configuring a resource for transmitting the channel state report message, wherein different resources are configured for the first field and the second field, respectively.

9. The wireless communication method of claim 1, further comprising obtaining the second field based on one of DM-RS (Demodulation Reference Signal), CSI-RS (CSI Reference Signal) for CSI, or CSI-RS for tracking.

10. A wireless communication method including:
receiving, by a network device, a channel state report message including at least one of a first field indicative of a value of a parameter or a second field that includes a deviation or a change rate of the parameter, and
wherein the channel state report message is received in response to a trigger of a channel state reporting transmitted by the network device to a user device,
wherein the channel state report message is transmitted by the user device according to a priority rule configured by the network device or pre-defined, wherein priority rules includes at least one of: i) the first field of the channel state report message is prioritized than a corresponding second field of the channel state report message, ii) when the wireless communication method further includes transmitting additional channel state report messages, the second field of an ith set channel state report message is prioritized than a jth set of channel state report message, wherein i and j are natural numbers which satisfy i<j, iii) the trigger of the channel state reporting has a priority order of aperiodic>semi-persistence>periodic, iv) the channel state report message for a wideband is prioritized than that for a subband, v) if a kth value and a lth value in the second field of the channel state report message are reported in a same resource, the kth value is dropped wherein k and l are natural numbers which satisfy l>k, vi) if the kth value and the lth value in the second field of the channel state report message are reported in different resources and within a same transmission unit, the kth value is dropped wherein k and l are natural numbers which satisfy l>k, or vii) when the wireless communication method further includes transmitting an additional channel state report message, if processing on the channel state report message or the additional channel state report message is stopped, the channel state report message is triggered again.

11. The wireless communication method of claim 10, wherein the first field includes a first granularity indicator, and the second field further includes a second granularity indicator, and
wherein at least one of the first granularity indicator or the second granularity indicator is configured by the network device, or configured from a predefined table, or determined by the user device from the predefined table.

12. The wireless communication method of claim 10, wherein the value of the parameter includes a value of CQI (Channel Quality Indication), a value of RSRP (Reference Signal Received Power), or a value of SINR (Signal to Interference and Noise Ratio).

13. The wireless communication method of claim 10, further comprising transmitting a report resource configuration, wherein the report resource configuration indicates one or more resources that satisfy at least one of i) a same resource or different resources are indicated for the first field and the second field, ii) DM-RS (Demodulation Reference Signal) is used for the second field, or iii) a power offset among the one or more resources is configured if the different resources are indicated for the first field and the second field.

14. A wireless communication apparatus configured to:
transmit a channel state report message that includes at least one of a first field indicative of a value of a parameter or a second field that includes a deviation or a change rate of the parameter, and
wherein the channel state report message is transmitted in response to a trigger of a channel state reporting received from a network device,
wherein the channel state report message is transmitted according to a priority rule configured by the network device or pre-defined, wherein priority rules includes at least one of: i) the first field of the channel state report message is prioritized than a corresponding second field of the channel state report message, ii) when the wireless communication apparatus is further configured to transmit additional channel state report messages, the second field of an ith set channel state report message is prioritized than a jth set of channel state report message, wherein i and j are natural numbers which satisfy i<j, iii) the trigger of the channel state reporting has a priority order of aperiodic>semi-persistence>periodic, iv) the channel state report message for a wideband is prioritized than that for a subband, v) if a kth value and a lth value in the second field of the channel state report message are reported in a same resource, the kth value is dropped wherein k and l are natural numbers which satisfy l>k, vi) if the kth value and the lth value in the second field of the channel state report message are reported in different resources and within a same transmission unit, the kth value is dropped wherein k and l are natural numbers which satisfy l>k, or vii) when the wireless communication apparatus is further configured to transmit an additional channel state report message, if processing on the channel state report message or the additional channel state report message is stopped, the channel state report message is triggered again.

15. The wireless communication apparatus of claim 14, wherein the trigger of the channel state reporting is performed by using a single signaling or multiple signaling based on a channel state reporting configuration received from the network device.

16. The wireless communication apparatus of claim 14, wherein the value of the parameter includes a value of CQI (Channel Quality Indication), a value of RSRP (Reference Signal Received Power), or a value of SINR (Signal to Interference and Noise Ratio).

17. The wireless communication apparatus of claim 14, wherein the first field further includes a first granularity indicator, and the second field further includes a second granularity indicator, and wherein at least one of the first granularity indicator or the second granularity indicator is configured by the network device, or configured from a predefined table, or determined from the predefined table.

18. The wireless communication apparatus of claim 14, wherein the wireless communication apparatus is further configured to calculate the second field by a calculation mode determined by a channel state reporting configuration received from the network device.

19. The wireless communication apparatus of claim 14, wherein the wireless communication apparatus is further configured to configure a resource for transmitting the channel state report message, wherein different resources are configured for the first field and the second field, respectively.

* * * * *